(12) United States Patent
Demissie et al.

(10) Patent No.: US 11,293,483 B2
(45) Date of Patent: Apr. 5, 2022

(54) BEARING ARRANGEMENT FOR A WIND TURBINE AND WIND TURBINE

(71) Applicant: Siemens Gamesa Renewable Energy A/S, Brande (DK)

(72) Inventors: Edom Demissie, Sheffield (GB); Peter Loevenskjold Falkenberg, Herning (DK); Niels Karl Frydendal, Herning (DK); Claus Michaelsen, Herning (DK); Morten Soerensen, Horsens (DK); Kim Thomsen, Skørping (DK); Morten Thorhauge, Ry (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/870,029

(22) Filed: May 8, 2020

(65) Prior Publication Data
US 2020/0362834 A1 Nov. 19, 2020

(30) Foreign Application Priority Data

May 16, 2019 (EP) ..................................... 19174858

(51) Int. Cl.
*F16C 17/03* (2006.01)
*F03D 80/70* (2016.01)
*F16C 33/10* (2006.01)

(52) U.S. Cl.
CPC .............. *F16C 17/03* (2013.01); *F03D 80/70* (2016.05); *F16C 33/108* (2013.01); *F05B 2240/53* (2013.01); *F05B 2240/54* (2013.01)

(58) Field of Classification Search
CPC ........ F16C 17/03; F16C 17/035; F16C 17/26; F16C 33/108; F16C 2240/50; F16C 2240/54; F03B 80/70
See application file for complete search history.

(56) References Cited

U.S. PATENT DOCUMENTS

| 2,778,696 A | 1/1957 | Lease |
| 3,905,250 A | 9/1975 | Sigg |

(Continued)

FOREIGN PATENT DOCUMENTS

| CN | 201502632 U | 6/2010 |
| CN | 103953644 A | 7/2014 |

(Continued)

OTHER PUBLICATIONS

European Search Report and Written Opinion of the European Searching Authority dated Oct. 18, 2019 for Application No. 19174858.1.

(Continued)

*Primary Examiner* — James Pilkington
(74) *Attorney, Agent, or Firm* — Schmeiser, Olsen & Watts LLP

(57) ABSTRACT

Provided is a bearing arrangement for a wind turbine including a bearing housing and a drive shaft, whereby the drive shaft is arranged within the bearing housing in an axial direction along a longitudinal axis of the bearing housing, the bearing arrangement further including a downwind bearing and an upwind bearing, whereby the downwind bearing and the upwind bearing are arranged between the bearing housing and the drive shaft, wherein the downwind bearing and/or the upwind bearing is a radial fluid bearing including multiple radial bearing pads, whereby each one of the multiple radial bearing pads is attached to one of a multiple radial bearing bodies of the radial fluid bearing and the multiple radial bearing pads are arranged about the drive shaft.

12 Claims, 11 Drawing Sheets

(56) References Cited

U.S. PATENT DOCUMENTS

| | | | | |
|---|---|---|---|---|
| 4,636,095 A | * | 1/1987 | Gerling | ........ F16C 17/03 384/114 |
| 9,995,283 B2 | | 6/2018 | Stiesdal | |
| 2004/0240759 A1 | | 12/2004 | Swann et al. | |
| 2018/0030964 A1 | | 2/2018 | Eriksen et al. | |

FOREIGN PATENT DOCUMENTS

| CN | 107191474 A | 9/2017 |
|---|---|---|
| EP | 3252306 A1 | 12/2017 |
| EP | 3 276 192 A1 | 1/2018 |
| EP | 3276192 A1 | 1/2018 |
| EP | 3460238 A1 | 3/2019 |
| EP | 3460269 A1 | 3/2019 |
| EP | 3460271 A1 | 3/2019 |
| EP | 3577356 A1 | 12/2019 |
| EP | 3577361 A1 | 12/2019 |
| GB | 1004733 A | 9/1965 |
| WO | WO 2018024410 A1 | 2/2018 |
| WO | WO 2018/166660 A1 | 9/2018 |
| WO | WO 2018/166663 A1 | 9/2018 |

OTHER PUBLICATIONS

Chinese Office Action dated Aug. 3, 2021 for Application No. 202010414205.X.

* cited by examiner

BEARING ARRANGEMENT FOR A WIND TURBINE AND WIND TURBINE

CROSS-REFERENCE TO RELATED APPLICATIONS

This application claims priority to European Application No. 19174858.1, having a filing date of May 16, 2019, the entire contents of which are hereby incorporated by reference.

FIELD OF TECHNOLOGY

The following relates to a bearing arrangement for a wind turbine and a wind turbine.

BACKGROUND

In general, bearing arrangements of wind turbines comprise a bearing housing and a drive shaft, whereby the drive shaft is arranged within the bearing housing in an axial direction along a longitudinal axis of the bearing housing. Bearings of the bearing arrangement are arranged about the drive shaft, so that the drive shaft can be rotated within the bearing housing by means of a rotor of the wind turbine. Such a bearing arrangement is known from EP 3 276 192 A1, for example.

Such a bearing may be a radial fluid bearing comprising multiple radial bearing bodies, multiple radial tiltable support structures secured to the multiple radial bearing bodies, whereby each one of a multiple of radial bearing pads is attached to one of the multiple radial tiltable support structures. The radial bearing pads must be securely locked in place with respect to the cylindrical seat. However, using for example bolts for securing the radial bearing bodies to the cylindrical seat or bearing housing may be disadvantageous. First, many loose parts are introduced into the radial fluid bearing when using a bolt connection. Second, the bolt connection may loosen up over time and require retightening. Third, the assembly space in the radial fluid bearing is very small and thus assembly of the radial fluid bearing as well as retightening a bolt connection is very cumbersome.

SUMMARY

An aspect relates to eliminate or at least reduce disadvantages in the conventional art techniques related to the arrangement of a radial fluid bearing in the bearing housing, in particular to provide a bearing arrangement for a wind turbine with a secure and simple radial fluid bearing having no or little maintenance effort.

Thereby, the features and details described in connection with the bearing arrangement of embodiments of the invention apply in connection with the wind turbine of embodiments of the invention, so that regarding the disclosure of the individual aspects of embodiments of the invention it is or can be referred to one another.

According to a first aspect of embodiments of the invention, embodiments of the invention relate to a bearing arrangement for a wind turbine comprising a bearing housing and a drive shaft, whereby the drive shaft is arranged within the bearing housing in an axial direction along a longitudinal axis of the bearing housing, the bearing arrangement further comprising a downwind bearing and an upwind bearing, whereby the downwind bearing and the upwind bearing are arranged between the bearing housing and the drive shaft, wherein the downwind bearing and/or the upwind bearing is a radial fluid bearing comprising multiple radial bearing pads, whereby each one of the multiple radial bearing pads is attached to one of a multiple radial bearing bodies of the radial fluid bearing and the multiple radial bearing pads are arranged about the drive shaft, whereby the multiple bearing bodies are arranged adjacent to one another along a circumference of a cylindrical seat of the bearing housing, whereby adjacent bearing bodies are locked in movement relative to one another and relative to the cylindrical seat by means of a press-fitted locking piece.

By means of embodiments of the invention, the radial fluid bearing with its radial bearing pads is arranged in the bearing housing in a secure and simple manner. The assembly of the bearing arrangement with its radial fluid bearing according to embodiments of the proposed invention does require only little assembly space, is practically free of maintenance and does not have loose parts.

The multiple radial tiltable support structures allow for the multiple radial bearing pads to be tiltable with respect to the drive shaft. Thereby, tolerances between the drive shaft and the radial bearing pads can be compensated for.

The downwind bearing is in particular arranged about a downwind portion of the drive shaft. The upwind bearing is in particular arranged about an upwind portion of the drive shaft. The downwind bearing may alternatively be referred to as a back-end bearing arranged about a back-end portion of the drive shaft. The upwind bearing may alternatively be referred to as a front-end bearing arranged about a front-end portion of the drive shaft. In a wind turbine, the front-end of the drive shaft is located closer to the rotor than its back-end.

The locking pieces protrude above the adjacent bearing bodies. Further, the locking pieces may protrude in such a way above the adjacent bearing bodies that there is a space between the locking pieces and the bearing bodies. By means of the thereby introduced space, further locking of the bearing bodies can be facilitated.

The locking pieces intrude into the cylindrical seat. The locking pieces may, for example, be arranged in grooves of the cylindrical seat. The locking pieces may than also be referred to as slide-in locking pieces as they can be easily slid into the groove of the cylindrical seat in an axial direction along the longitudinal axis of the bearing housing.

It is preferred, that the locking pieces provide dovetail connections with the cylindrical seat. For example, grooves in the cylindrical seat may have one or more undercuts for providing the dovetail connection and thereby safely securing the locking pieces in the cylindrical seat.

It is further preferred, that bottom portions of the locking pieces are extending in tangential directions along the circumference of the cylindrical seat. For example, undercuts in grooves may extend in a tangential direction of the circumference of the cylindrical seat. The bottom portions of the locking pieces may be arranged within these grooves or undercuts so that a particularly stable locking connection is provided.

It is moreover preferred, that at least one of the locking pieces is a T-bar element or an I-bar element. Furthermore, all locking pieces may be T-bar and/or I-bar elements. T-bar elements substantially have the shape of a T and I-bar elements substantially have the shape of an I when viewed along an axial direction along the longitudinal axis of the bearing housing. These shapes are particularly preferred as they provide good interlocking.

In particular, the T-bar element or the I-bar element is made from a rigid material. The rigid material may be a metal, for example. Thereby, the T-bar element or the I-bar element can withstand the high forces that act upon it without failure.

At least one spring element is arranged between the at least one of the locking pieces and one of the adjacent radial bearing bodies. The at least one spring element may be in particular arranged between an upper part of the locking piece and a top surface of the one radial bearing body. In particular, two spring elements may be arranged between the at least one of the locking pieces and one of the adjacent radial bearing bodies. The two spring elements may be separated from one another, in particular by means of the locking piece which is arranged in between the two spring elements. The spring elements support the locking pieces in locking the radial bearing bodies against the cylindrical seat in a radial direction by providing pretension. The radial direction is a direction from the cylindrical seat to the drive shaft.

In particular, a rigid element is arranged between the at least one spring element and the at least one of the adjacent bearing bodies. The rigid element may be made from metal, for example. Thereby, the spring characteristic of the spring element can be adapted.

The spring element is an elastomer. Compared to a mechanical spring element, which is also possible, the elastomer can be implemented and exchanged between the locking piece and bearing body in a simple way.

The locking piece comprises a stop plate arranged against a rim of the cylindrical seat in an axial direction along the longitudinal axis. The stop plate may be connected to the rim of the cylindrical seat by means of bolts, for example. Thereby, the movement of the bearing bodies in an axial direction along the longitudinal axis is locked.

At least one wear protection element is arranged between at least one of the locking pieces and the cylindrical seat or a radial bearing body. In particular, at least two wear protection elements may be arranged between the locking pieces and the cylindrical seat, whereby the wear protection elements are separated from one another by means of the locking pieces. Further, in particular, at least two wear protection elements may be arranged between the locking pieces and the radial bearing bodies, whereby the wear protection elements are separated from one another by means of the locking pieces and each one of the at least two wear protection elements is in contact with only one of the radial bearing bodies. The wear protection elements may comprise or be made from a polymer, in particular a thermosetting polymer. The wear protection elements reduce the risk of fretting of the locking piece.

Each one of the multiple radial bearing pads may be attached to one of the multiple radial bearing bodies by means of a radial tiltable support structure, whereby in particular the radial tiltable support structure is connected to at least one of the multiple radial bearing bodies by means of a spring connection. At least one of the multiple radial tiltable support structures may comprise a ball head. The ball head can provide a tilting functionality for compensation of tolerances in the radial fluid bearing. Moreover, the at least one of the multiple radial bearing bodies securing the at least one of the multiple radial tiltable support structures comprising the ball head may comprise a ball socket for the ball head.

The cylindrical seat may be formed in the bearing housing. In particular, the cylindrical seat may be formed by an inner shell surface of the bearing housing. Moreover, the cylindrical seat may be integrally formed, in particular monolithically designed, with the bearing housing. Thereby, the cylindrical seat of the radial fluid bearing is stably provided at the bearing housing.

At least one curved interface plate may be attached to at least one of the multiple radial bearing bodies opposite of the radial bearing pad, whereby the interface plate is arranged in contact with the cylindrical seat of the radial fluid bearing. Thereby, the radial bearing pads are arranged with respect to the drive shaft with very little tolerances and at low cost with respect to manufacture and assembly. A curved interface plate may be attached to each one of the multiple radial bearing bodies opposite of the radial bearing pad, whereby the interface plates are arranged in contact with a cylindrical seat of the radial fluid bearing. A first interface plate side of the at least one interface plate, which is contact with the cylindrical seat, may have a curvature corresponding to a curvature of the cylindrical seat. Thereby, the interface plate may be provided with a large contact surface contacting the cylindrical seat, whereby the stability of the radial fluid bearing is improved. Further, a second interface plate side of the at least one interface plate, which is located opposite of the first interface plate, may be predominantly plain or plain. Predominantly in this sense means that more than half of the surface of the second interface plate side is plain. Thereby, attachment of the radial bearing body to the interface plate may be facilitated. At least one of the at least one interface plate may comprise at least one interface plate attachment means for attaching the at least one interface plate to the at least one of the multiple radial bearing bodies. The at least one of the multiple radial bearing bodies may comprise a corresponding radial bearing body attachment means. The interface plate attachment means and the corresponding radial bearing body attachment means may be attached to each other by a further attachment means element. Thereby, the interface plate may be securely attached to radial bearing body. At least one of the at least one interface plate attachment means may be an interface plate through hole. The interface plate through hole may comprise threads, for example. A radial bearing body attachment means may further be a radial bearing body through hole, which also may comprise threads. An attachment means element may be a bolt, in particular a threaded bolt, for example.

According to a second aspect of embodiments of the invention, embodiments of the invention relate to a wind turbine comprising a bearing arrangement according to embodiments of the invention, whereby the wind turbine further comprises a rotor connected to drive the drive shaft and a generator connected to be driven by the drive shaft.

The generator may be a direct drive generator or a geared generator having a gearbox, for example. The rotor is also commonly referred to as a hub of the wind turbine. Two, three or more wind turbine blades may be attached to the rotor or hub. The wind turbine may further comprise a nacelle, which may be supported on a tower of the wind turbine. The nacelle may comprise the bearing arrangement. The bearing arrangement, in particular the bearing housing, and the generator may be attached to the nacelle and/or the tower.

BRIEF DESCRIPTION

Some of the embodiments will be described in detail, with references to the following Figures, wherein like designations denote like members, wherein:

FIG. 1 a side view on a wind turbine;

FIG. 2 a side perspective view on a sectional cut along the longitudinal axis of a bearing arrangement of the wind turbine of FIG. 1;

FIG. 3 a side view on a sectional cut along the bearing arrangement of the wind turbine of FIG. 1;

DETAILED DESCRIPTION

Figure 1:
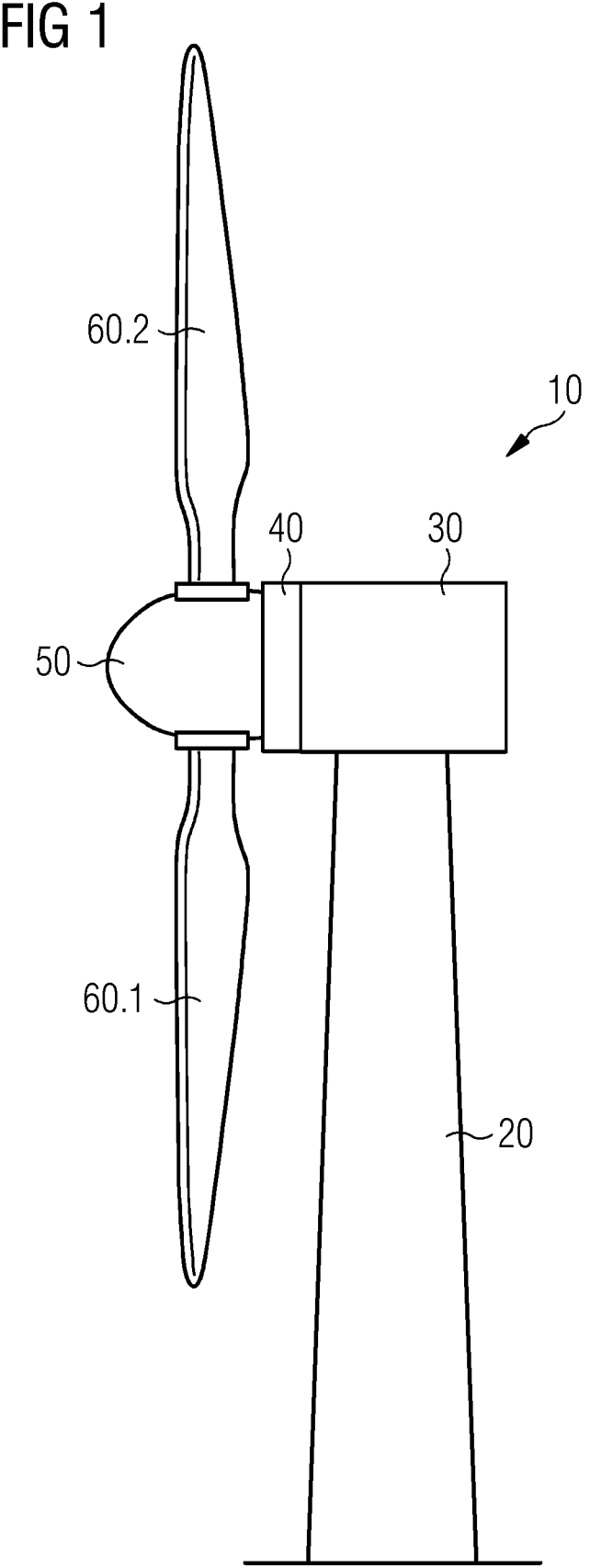

FIG. 1 shows a side view on a wind turbine 10. The wind turbine 10 comprises a supporting tower 20 and a nacelle 30, whereby the nacelle 30 is attached to the supporting tower 20. The nacelle 30 comprises a bearing arrangement 70, which is not shown in FIG. 1 but can be seen in FIG. 2. The wind turbine 10 further comprises a generator 40 attached to a rotor 50 of the wind turbine 10. Two wind turbine blades 60.1, 60.2 are attached to the rotor 50.

Figure 2:
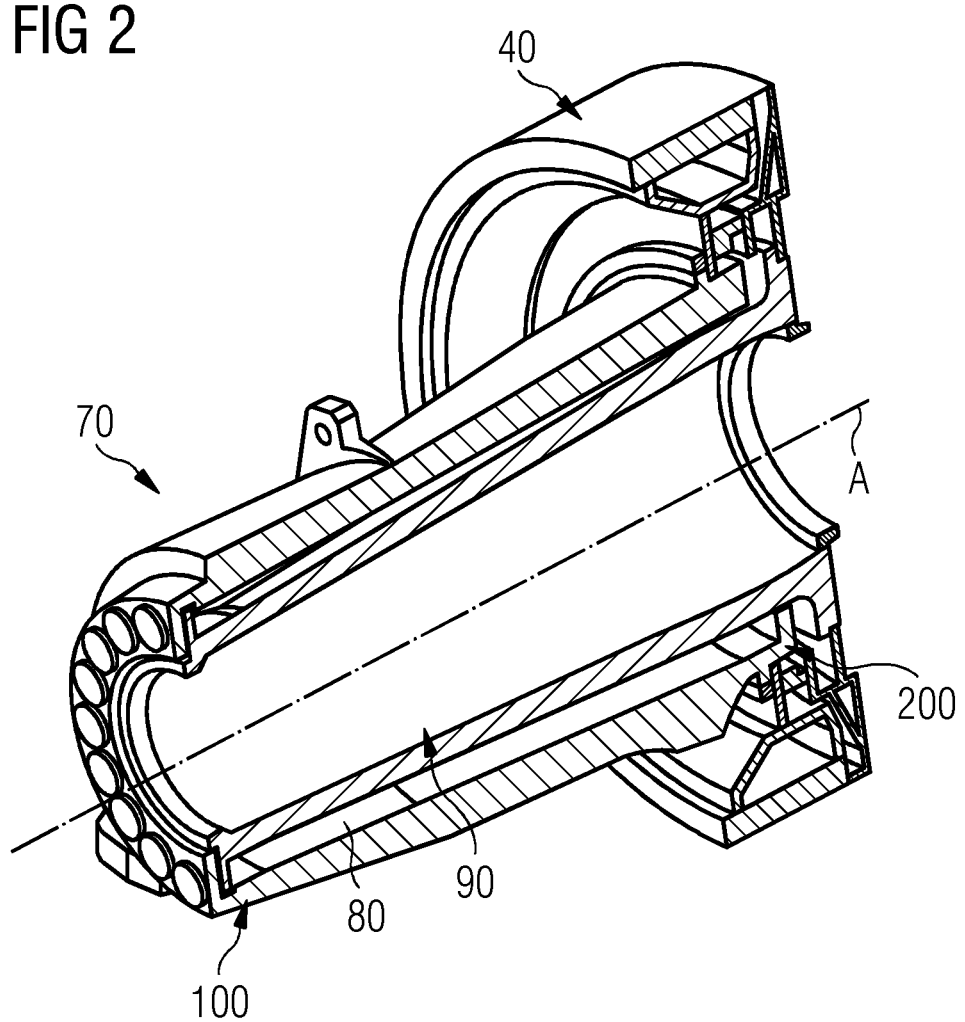

FIG. 2 shows a side perspective view on a sectional cut along the longitudinal axis A of the bearing arrangement 70 of the wind turbine 10 of FIG. 1. The bearing arrangement 70 comprises a bearing housing 80 and a drive shaft 90, whereby the drive shaft 90 is arranged within the bearing housing 80 in an axial direction along the longitudinal axis A of the bearing housing 80 as indicated in FIG. 2. The longitudinal axis A of the bearing housing 80 corresponds to the longitudinal axis A of the drive shaft 90 and thereby is a longitudinal axis A of the bearing arrangement 70. The bearing arrangement 90 further comprises a downwind bearing 100 and an upwind bearing 200 as radial fluid bearings, whereby the downwind bearing 100 and the upwind bearing 200 are arranged between the bearing housing 80 and the drive shaft 90. In particular, the downwind bearing 100 is arranged about a downwind portion of the drive shaft 90 and the upwind bearing 200 is arranged about an upwind portion of the drive shaft 90. The drive shaft 90 is operatively connected to the generator 40. The generator 40 is shown as a direct drive generator. However, it is also possible to provide the generator 40 as a geared generator, for example.

Figure 3:
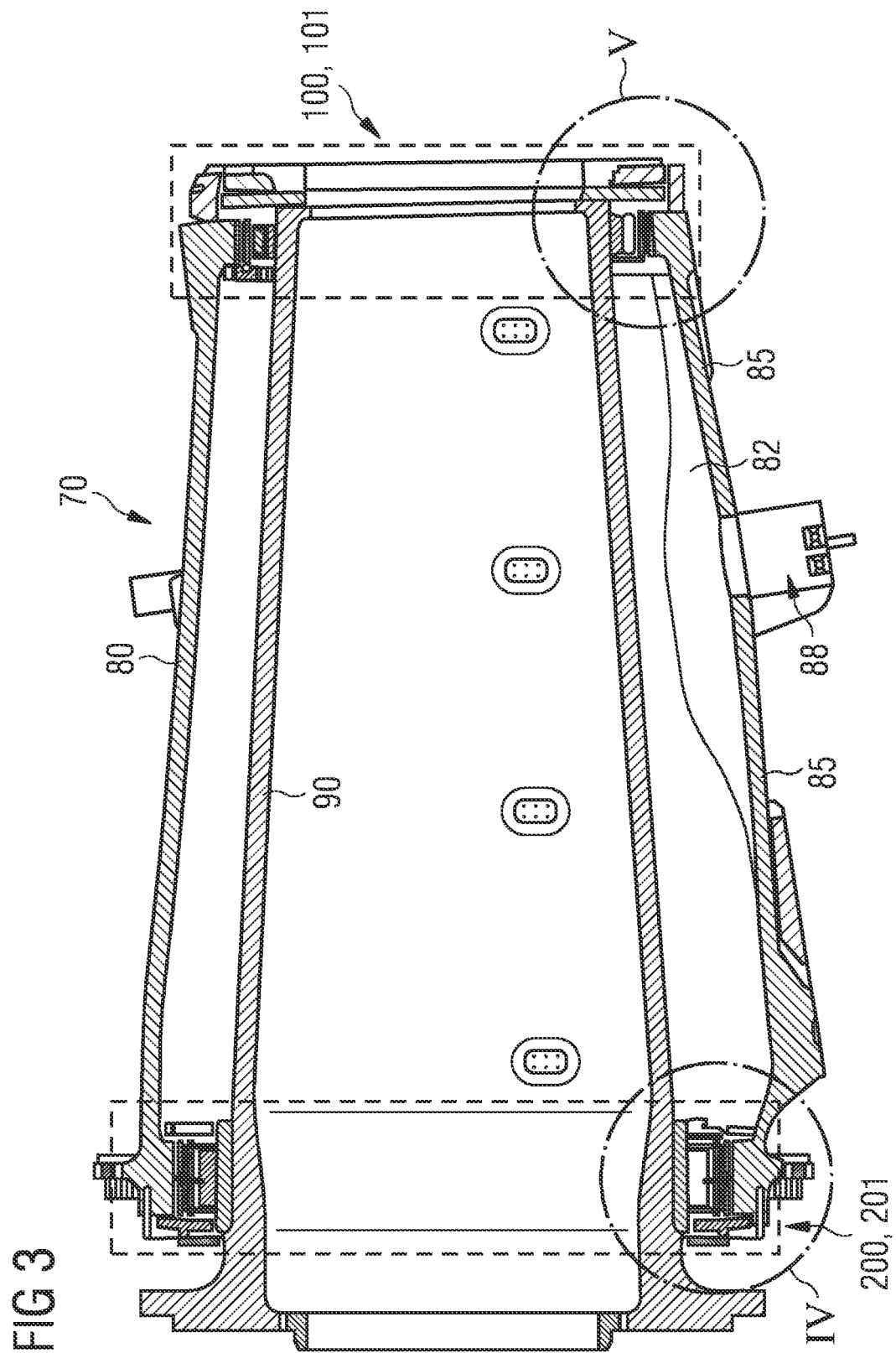

FIG. 3 shows a side view on a sectional cut along the longitudinal axis A of the bearing arrangement 70 of FIG. 2. An internal space 82 of the bearing housing 80 is formed between the bearing housing 80 and the drive shaft 90. Lubricant may leak from the downwind bearing 100 and the upwind bearing 200 into the internal space 82 and thereby be collected in the bearing housing 80, which is formed as a funnel 85 in a bottom part of the bearing housing 80. A lubricant pump 88 is fluidically connected to a drain outlet (not shown) of the bearing housing 80. Moreover, the downwind bearing 100 comprising a lubricant flooded chamber 101 and the upwind bearing 200 comprising a lubricant flooded chamber 201 are shown, the principle and features of which will further be explained with reference to FIG. 4 and FIG. 5.

Figure 4:
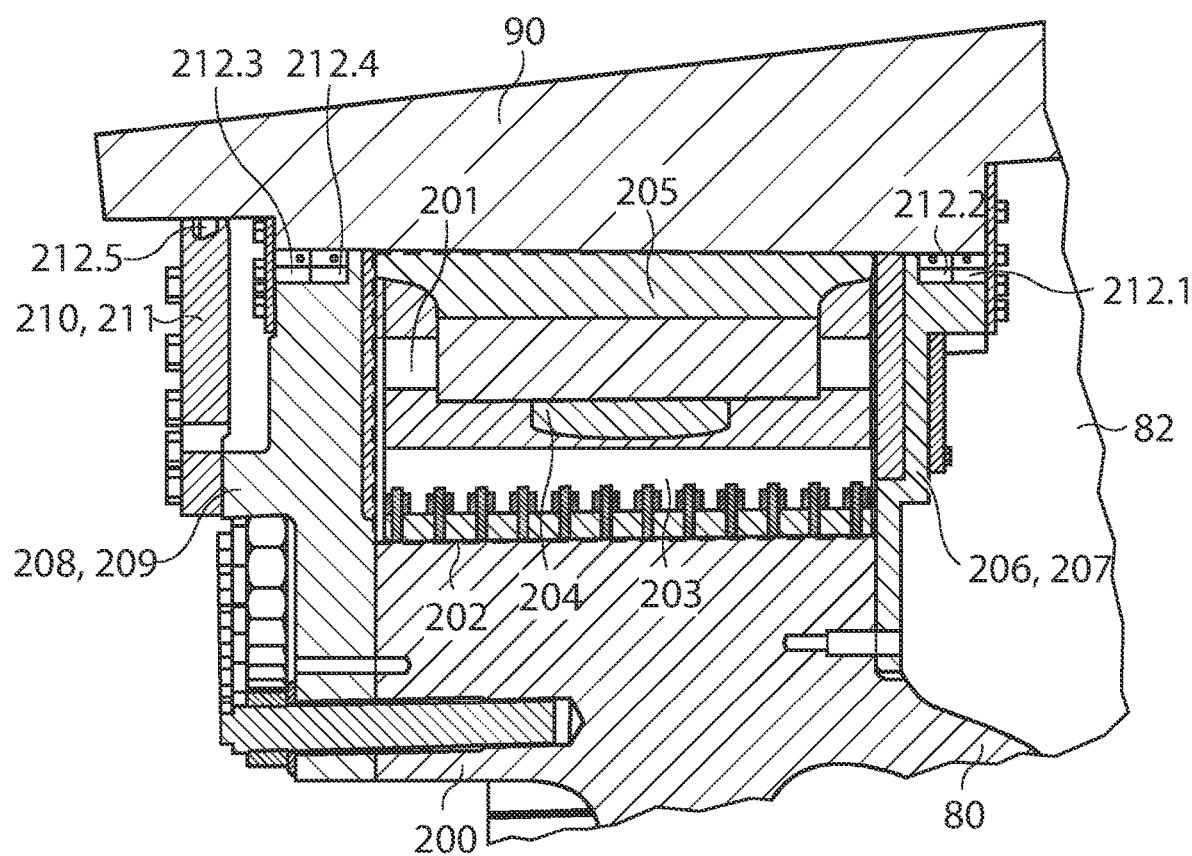
FIG. 4 shows a view on a detail of the bearing arrangement of FIG. 3.

FIG. 4 shows an enlarged view on the sectional cut through the upwind bearing 200 and its lubricant flooded chamber 201 according to the detail IV of FIG. 3. A radial bearing body 203 is attached to the bearing housing 80. Specifically, the radial bearing body 203 is attached to a cylindrical seat 202 formed in the bearing housing 80. A radial tiltable support structure 204 is secured to the radial bearing body 203. A radial bearing pad 205 is attached to the radial tiltable support structure 204. The radial bearing pad 205 is arranged in sliding contact with the drive shaft 90. The radial tiltable support structure 204 allows for a tilting movement of the radial bearing pad 205. Multiple of such radial bearing units comprising a radial bearing body 203, a radial tiltable support structure 204 and a radial bearing pad 205 are arranged in series along the cylindrical seat 202 in the lubricant flooded chamber 201, in particular along a circumference of the cylindrical seat 202 of the upwind bearing 200.

The lubricant flooded chamber 201 of the upwind bearing 200 is sealed by means of an inner sealing 206 against the internal space 82 of the bearing housing 80. The inner sealing 206 of the lubricant flooded chamber 201 of the upwind bearing 200 comprises multiple inner sealing plates 207. Two lip seals 212.1, 212.2 are arranged in series between the inner sealing 206 and the drive shaft 90 so as to seal the sealing 206 against the drive shaft 90.

The lubricant flooded chamber 201 of the upwind bearing 200 is sealed against an outside of the bearing housing 80 by means of an outer sealing 208 and a dust sealing 210. The outer sealing 208 comprises an outer seal plate 209 and two lip seals 212.3, 212.4 arranged in series in between the outer seal plate 209 and the drive shaft 90. The dust sealing 210 is formed by a dust seal plate 211 and a further lip seal 212.5 arranged between the dust seal plate and the drive shaft 90. The dust sealing 210 is located towards the outside of the bearing housing 80. The dust sealing 210 sandwiches the outer sealing 208 in between the dust sealing 210 and the outer sealing 206.

Figure 5:
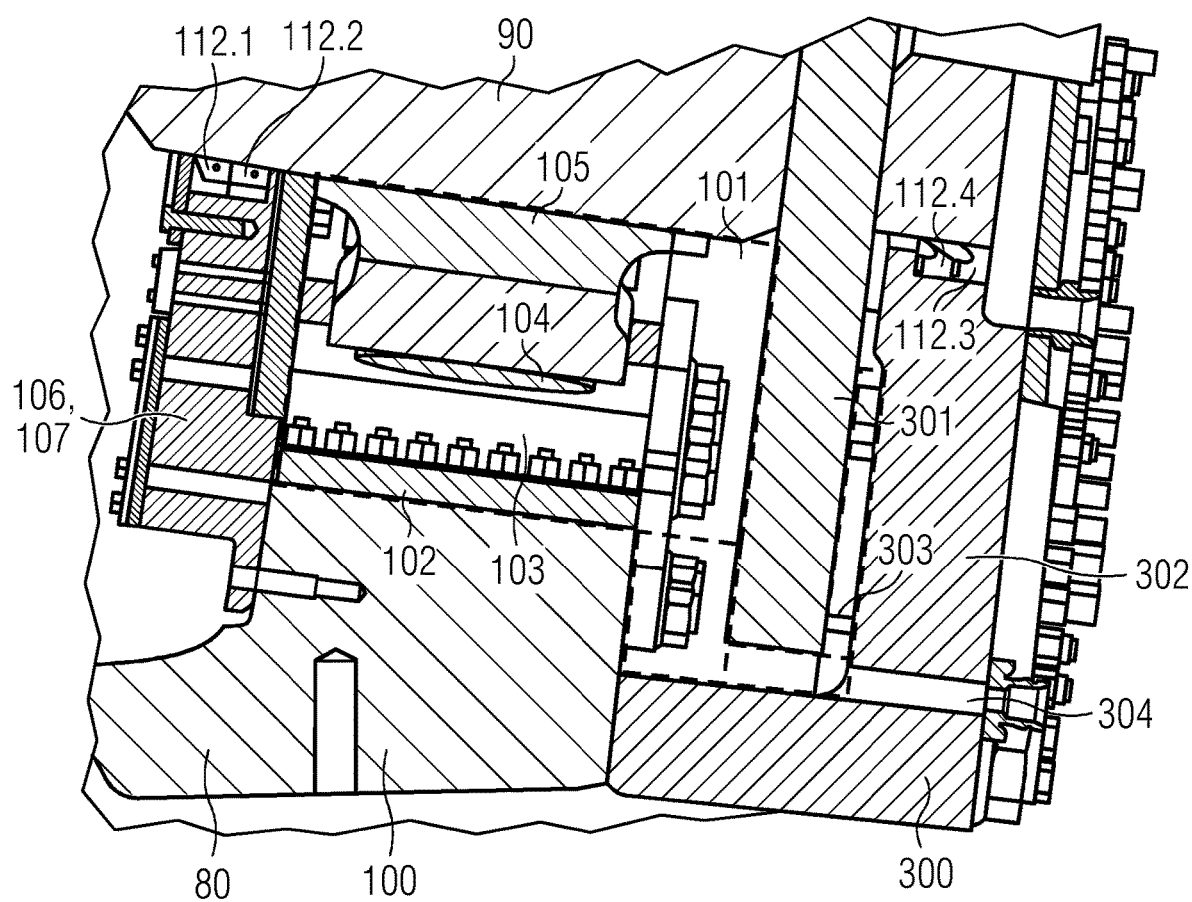
FIG. 5 shows a view on a further detail of the bearing arrangement of FIG. 3.

FIG. 5 shows an enlarged view on the sectional cut through the downwind bearing 100 and its lubricant flooded chamber 101 according to the detail C of FIG. 3. A radial bearing body 103 is attached to a bearing housing 80. Specifically, the radial bearing body 103 is attached to a cylindrical seat 102 formed in the bearing housing 80. A radial tiltable support structure 104 is secured to the radial bearing body 103. A radial bearing pad 105 is attached to the radial tiltable support structure 104. The radial bearing pad 105 is arranged in sliding contact with the drive shaft 90. The radial tiltable support structure 104 allows for a tilting movement of the radial bearing pad 105. Multiple of such radial bearing units comprising a radial bearing body 103, a radial tiltable support structure 104 and a radial bearing pad 105 are arranged in a series along the cylindrical seat 102 in the lubricant flooded chamber 101, in particular along a circumference of the cylindrical seat 102 of the downwind bearing 100.

The lubricant flooded chamber 101 of the downwind bearing 100 is sealed by means of an inner sealing 106 against the internal space 82 of the bearing housing 80. The inner sealing 106 of the lubricant flooded chamber 101 of the downwind bearing 100 comprises multiple inner sealing plates 107. Two lip seals 112.1, 112.2 are arranged in series between the inner sealing 106 and the drive shaft 90 so as to seal the sealing 106 against the drive shaft 90.

The lubricant flooded chamber 101 is fluidically connected to an effective path provided by a lubricant flow channel 303 of an axial bearing 300 of the bearing arrangement 70. The axial bearing 300 comprises an axial collar 301 and multiple axial bearing pads (not shown here) attached to an axial bearing stop 302. The axial collar 301 is attached to the drive shaft 90. The axial collar 301 extends outwards from the drive shaft 90. The axial collar 301 extends along an entire circumference of the drive shaft 90. The lubricant flow channel 303 of the axial bearing 300 is formed between the axial collar 301 and the multiple axial bearing pads of the axial bearing stop 302. An overflow channel 304 of the axial bearing 300 is arranged in fluidical contact with the lubricant flooded chamber 101. By means of the overflow channel 304, excessive lubricant may be released out of the lubricant flooded chamber 101. The overflow channel 304 may be connected to the internal space 82 for releasing the lubricant into the bearing housing 80. The downwind bearing 100 has the axial bearing 300 as a sealing of the oil flooded chamber 101 against the outside of the bearing housing 80.

Figure 6:
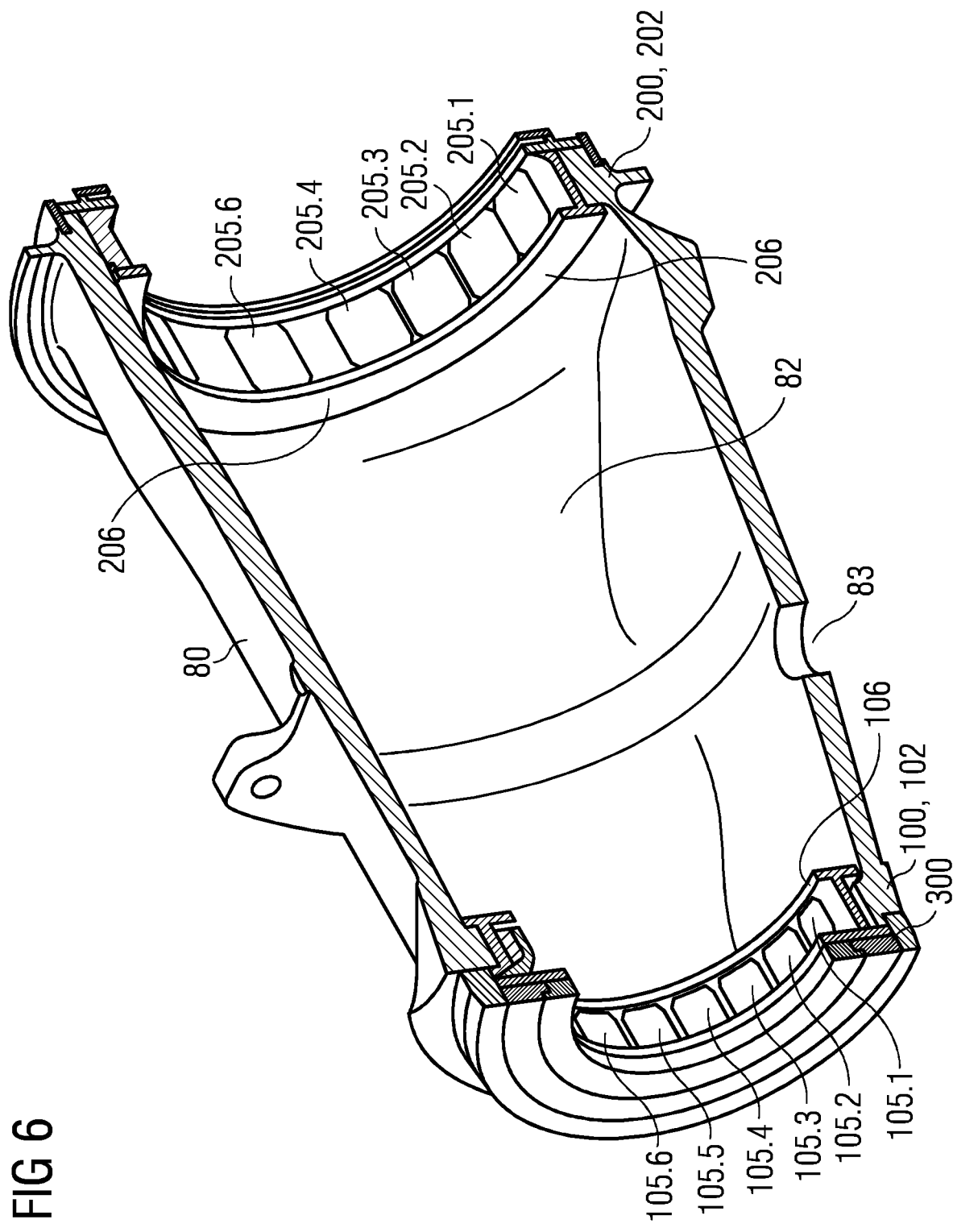
FIG. 6 shows a side perspective view on a sectional cut along the longitudinal axis of another bearing arrangement of the wind turbine of FIG. 1.

FIG. 6 shows a side perspective view on a sectional cut along the longitudinal axis A of another bearing housing 80 of the wind turbine 10 of FIG. 1 and through the drain outlet 83. As can be seen, there are multiple radial bearing pads 105.1, 105.2, 105.3, 105.4, 105.5, 105.6 arranged as a series at the cylindrical seat 102 of the downwind bearing 100. The inner sealing 106 is arranged between the radial bearing pads 105.1, 105.2, 105.3, 105.4, 105.5, 105.6 and the internal space 82 of the bearing housing 80 and attached to the bearing housing 80, in particular to the cylindrical seat 102. Moreover, the axial bearing 300 is arranged at the bearing housing 80 next to the downwind bearing 100. Moreover, there are multiple radial bearing pads 205.1, 205.2, 205.3, 205.4, 205.5, 205.6 arranged at the cylindrical seat 202 of the upwind bearing 200. An inner sealing 206 is arranged between radial bearing pads 205.1, 205.2, 205.3, 205.4, 205.5, 205.6 and the internal space 82 of the bearing housing 80 and attached to the bearing housing 80, in particular to the cylindrical seat 202.

Figure 7:
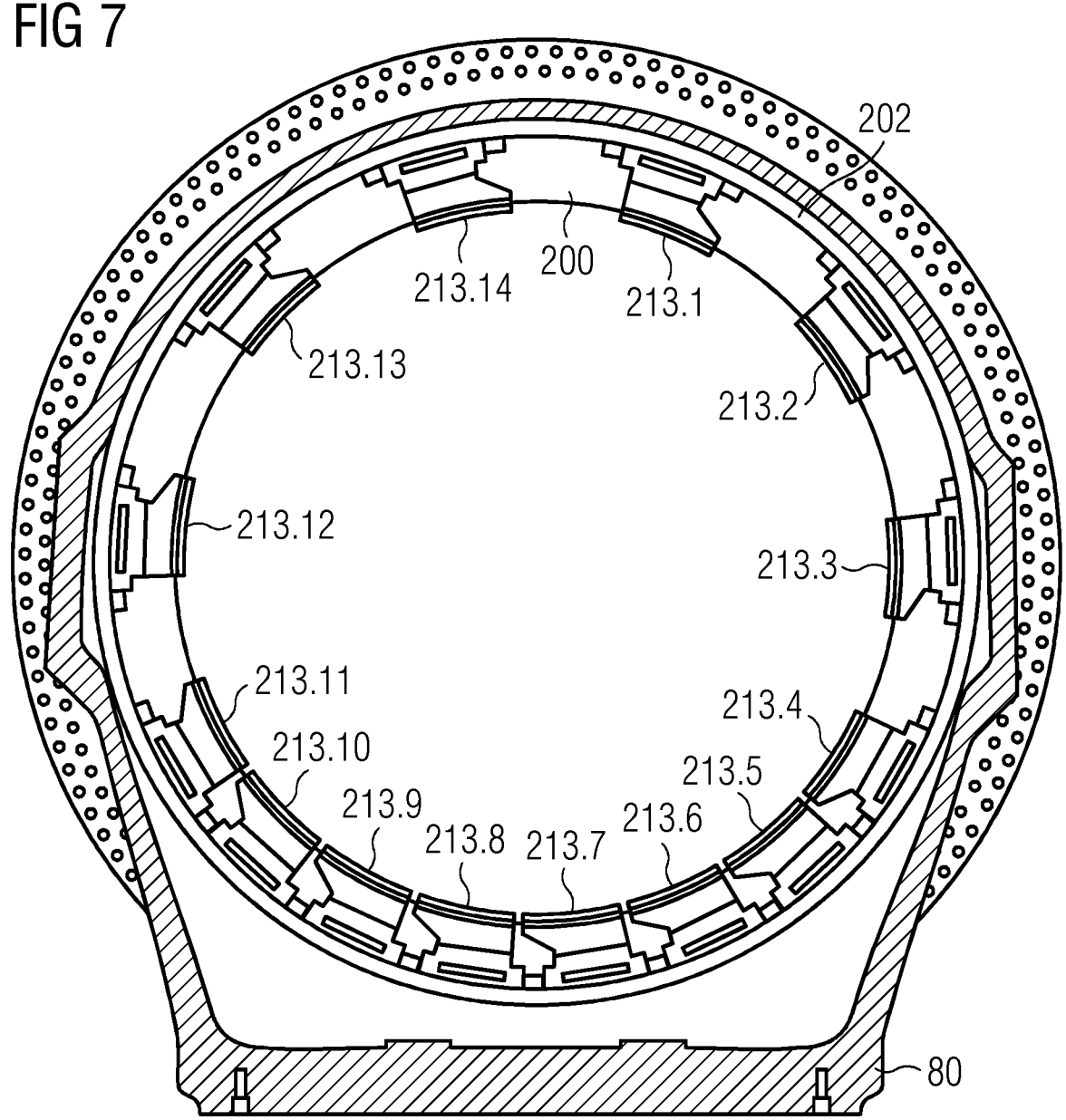
FIG. 7 shows a front view on a sectional cut through the bearing arrangement of FIG. 6.

FIG. 7 shows a front view on a sectional cut through the bearing arrangement 70 of FIG. 6 of the upwind bearing 200. Multiple radial bearing units 213.1, 213.2, 213.3, 213.4, 213.5, 213.6, 213.7, 213.8, 213.9, 213.10, 213.11, 213.12, 213.13, 213.14 are attached to the cylindrical seat 202 of the upwind bearing 200.

Figure 8:
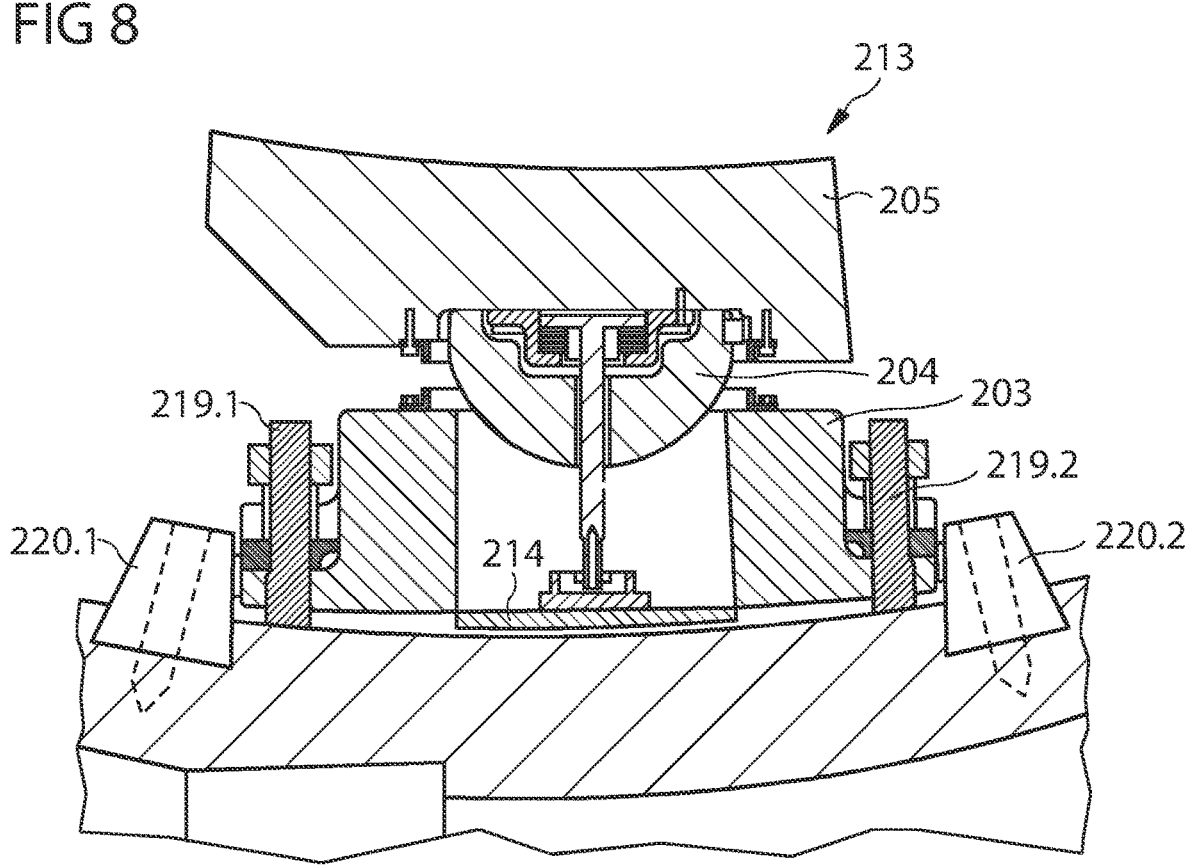
FIG. 8 shows a view on a detail of the bearing arrangement of FIG. 7 showing a radial bearing unit.

FIG. 8 shows a view on a detail of the bearing arrangement 70 of FIG. 7 showing a sectional cut of the radial bearing unit 213 and its attachment to the cylindrical seat 202 of the bearing housing 80. A curved interface plate 214 is attached to the radial bearing body 203 of the radial bearing unit 213 opposite of the radial bearing pad 205, whereby the interface plate 214 is arranged in contact with a cylindrical seat 202 of the upwind bearing 200 formed as a radial fluid bearing. The radial bearing body 203 comprises a ball socket for the radial tiltable support structure 204, which comprises a ball head resting on the ball socket.

Figure 9:
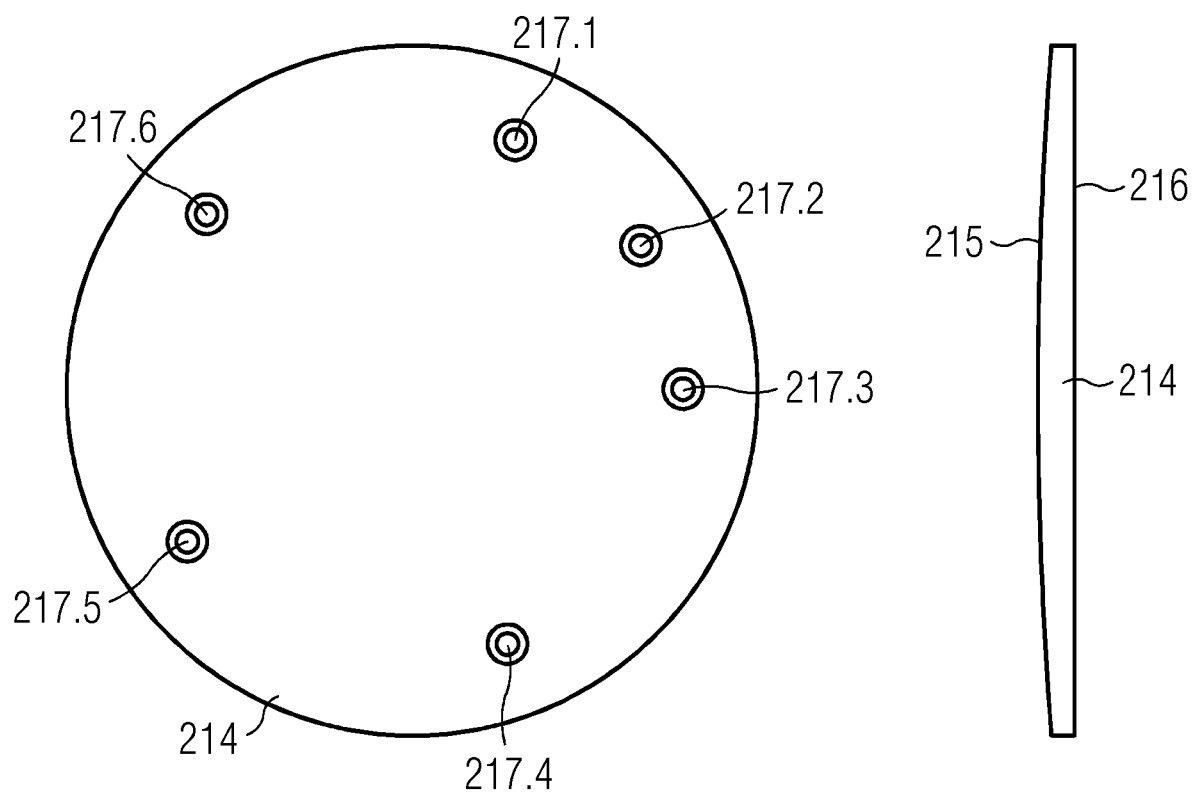
FIG. 9 shows two views on a curved interface plate as shown in the bearing arrangement of FIG. 8.

As shown in FIG. 9, the interface plate 214 comprises a first interface plate side 215 and a second interface plate side 216. The first interface plate side 215 and the second interface plate side 216 have circular circumferences. In other words, the interface plate 214 has a circular circumference. The first interface plate side 215 is located opposite of the second interface plate side 216. The second interface plate side 216 is plain. The first interface plate side 215 has a curvature corresponding to the curvature of the cylindrical seat 202. Further, the interface plate 214 comprises six interface plate through holes 217.1, 217.2, 217.3, 217.4, 217.5, 217.6 arranged throughout the interface plate 214. In particular, the interface plate through holes 217.1, 217.2, 217.3, 217.4, 217.5, 217.6 are arranged around a center of the interface plate 214.

As further shown in FIG. 8, the interface plate 214 is contacting with its first interface plate side 215 the cylindrical seat 202 of the bearing housing 80. The interface plate is connected by means of the along the sectional cut visible interface plate through hole 217, in which a bolt fastening the interface plate 214 to the radial bearing body 203 may be inserted.

The radial bearing body 203 is fixed to the cylindrical seat by means of two fastening elements 219.1, 219.2, for example bolts, partially extending through the radial bearing body 203 and protruding into the cylindrical seat 202 of the bearing housing 80. The fastening elements 219.1, 219.2 are located opposite of one another in the tangential direction along the circumference of the cylindrical seat 202. The fastening elements 219.1, 219.2 prevent movement of the interface plate 214 and thereby the radial bearing body 203 in a radial direction from the bearing housing 80 to the drive shaft 90.

The radial bearing body 203 is fixed by means of two limit stops 220.1, 220.2 arranged in grooves of the cylindrical seat 202 of the bearing housing 80 so as to prevent a movement of the interface plate 214 and thereby the radial bearing body 203 in a tangential direction along the circumference of the cylindrical seat 202. However, the provision of these limit stops 220.1, 220.2 is not according to embodiments of the invention. The two limit stops 220.1, 220.2 are arranged adjacent to and in contact with the radial bearing body 203 in a tangential direction along the circumference of the cylindrical seat 202 and opposite of each other in the tangential direction.

Figure 10:
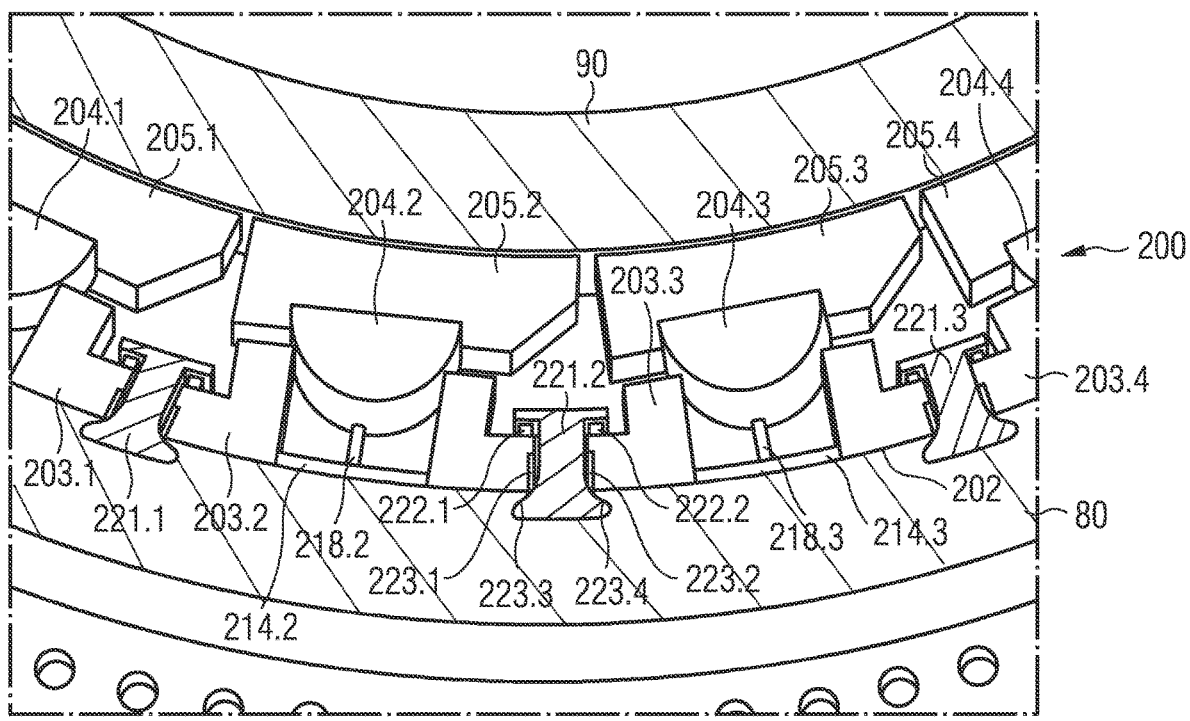
FIG. 10 shows a front view on a section of a sectional cut through yet another bearing arrangement of the wind turbine of FIG. 1.

FIG. 10 shows a front view on a section of a sectional cut through yet another bearing arrangement 70 of the wind turbine 10 of FIG. 1, whereby the sectional cut is positioned before the upwind bearing 200. Different from the bearing arrangements 70 of FIG. 7 and FIG. 8, there are no limit stops 220.1, 220.2 arranged adjacent to the radial bearing bodies 203.1, 203.2, 203.3, 203.4. Instead, the radial bearing bodies 203.1, 203.2, 203.3, 203.4, which are arranged adjacent to one another along a circumference of a cylindrical seat 202 of the bearing housing 80, are locked in movement relative to one another and relative to the cylindrical seat 202 by means of press-fitted locking pieces 221.1, 221.2, 221.3 in three directions according to embodiments of the invention. These three directions are the axial directions along the longitudinal axis A, the tangential direction along the circumference of the cylindrical seat 202 and the radial direction from the cylindrical seat 202 towards the drive shaft 90. The locking mechanism by means of the locking pieces 221.1, 221.2, 221.3 will now further be explained.

The locking pieces 221.1, 221.2, 221.3 are provided as T-bar elements and protrude above the adjacent radial bearing bodies 203.1, 203.2, 203.3, 203.4 and intrude into the cylindrical seat 202, in particular into grooves having undercuts provided therein. The grooves are provided along the longitudinal axis A within the cylindrical seat 202, which is formed in the bearing housing 80 itself, in this particular embodiment. The undercuts extend in the tangential directions. Thereby, by means of the locking pieces 221.1. 221.2, 221.3 dovetail connections of the radial bearing bodies 203.1, 203.2, 203.3 with the bearing housing 80 are provided. The dovetail connections lock a movement of the bearing bodies 203.1, 203.2, 203.3 and thereby the thereto via the radial tiltable support structures 204.1, 204.2, 204.3, 204.4 attached radial bearing pads 205.1, 205.2, 205.3, 205.4 in the tangential directions.

A locking in the radial direction is achieved by means of spring elements 222.1, 222.2, which are only denominated with respect to the locking piece 221.2 for reasons of clarity of the figure. The spring elements 221.1, 222.2 are provided as elastomers and are arranged between an upper part of the T shaped locking piece 221.2 and the radial bearing bodies 203.2, 203.3.

Wear protection elements 223.1, 223.2, 223.3, 223.4 are arranged between the locking piece 221.2 and the bearing housing 80 and the radial bearing bodies 203.2, 203.3. In particular, the wear protection elements 223.1, 223.2 are arranged between the locking piece 221.2 and the radial bearing bodies 203.2, 203.3 and the wear protection elements 223.3, 223.4 are arranged between the locking piece 221.2 and the bearing housing 80, in particular at a location of the undercuts. The wear protection elements 223.1, 223.2, 223.3, 223.4 protect the locking piece 221.2 from wear.

Figure 11:
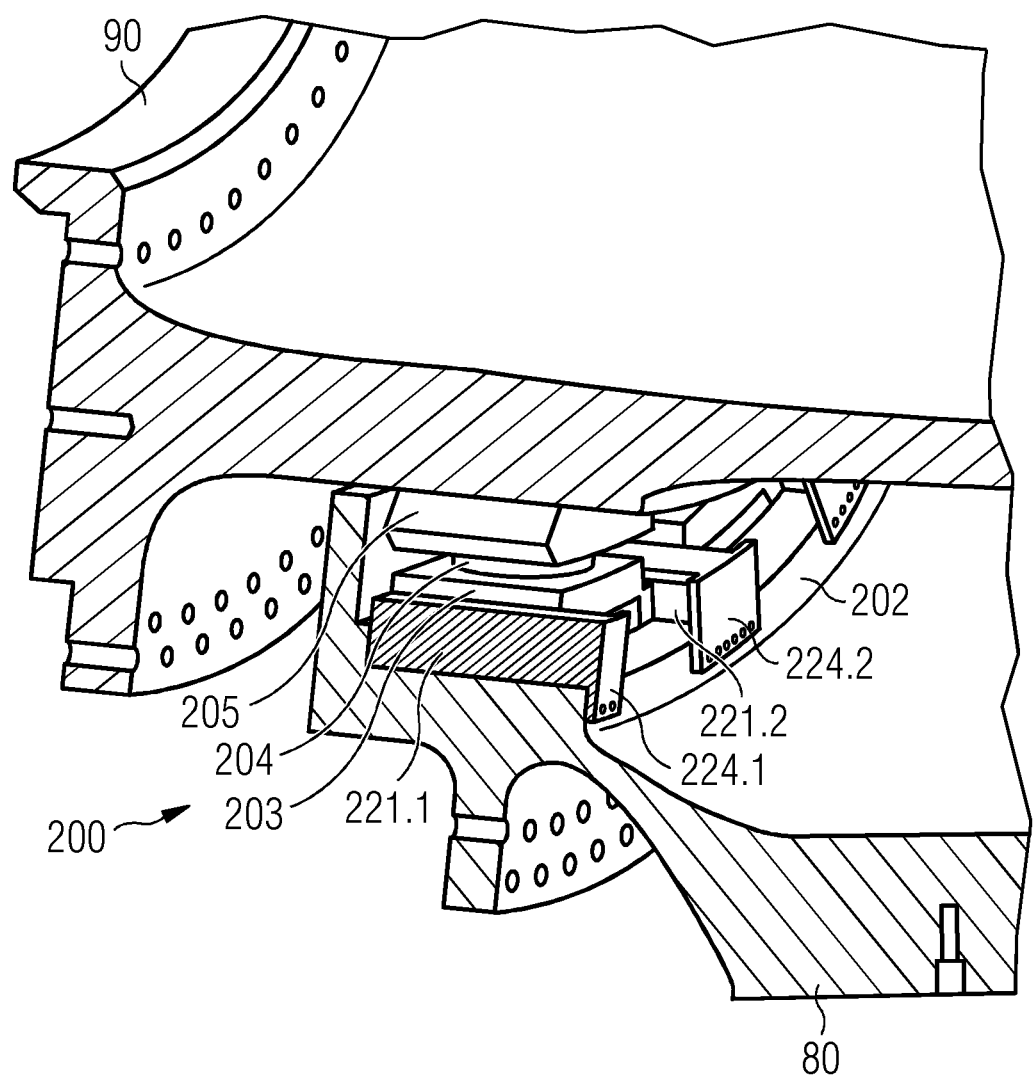
FIG. 11 shows a side perspective view on a sectional cut along the longitudinal axis of the bearing arrangement of FIG. 10.

FIG. 11 shows a side perspective view on a sectional cut along the longitudinal axis A of the bearing arrangement 70 of FIG. 10. As can be seen, a stop plate 224.2 is integrally formed with locking piece 221.2. The stop plate 224.2 has a larger extension in a radial direction than the locking piece 221.2. Thereby, the stop plate 224.2 is pressed against a rim of the cylindrical seat 202. The rim, as shown, may be a portion of the bearing housing 80 that is raised over the inner cylindrical surface of the bearing housing 80 and on which the cylindrical seat 202 may be provided for the radial fluid bearing. The stop plate 224.2 is bolted to the rim of the cylindrical seat 202. The stop plate 224.2 provides a locking in the axial direction along the longitudinal axis A.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bearing arrangement for a wind turbine comprising:
   a bearing housing;
   a drive shaft, wherein the drive shaft is arranged within the bearing housing in an axial direction along a longitudinal axis of the bearing housing;
   a downwind bearing; and
   an upwind bearing, the downwind bearing and the upwind bearing being arranged between the bearing housing and the drive shaft, wherein the downwind bearing and/or the upwind bearing is a radial fluid bearing comprising multiple radial bearing pads;
   wherein each one of the multiple radial bearing pads is attached to one of a multiple radial bearing bodies of the radial fluid bearing and the multiple radial bearing pads are arranged about the drive shaft;
   wherein the multiple bearing bodies are arranged adjacent to one another along a circumference of a cylindrical seat of the bearing housing, the adjacent bearing bodies being locked in movement relative to one another and relative to the cylindrical seat by means of press-fitted locking pieces that provide dovetail connections with the cylindrical seat.

2. The bearing arrangement according to claim 1, wherein the press-fitted locking pieces protrude above the adjacent bearing bodies.

3. The bearing arrangement according to claim 1, wherein the press-fitted locking pieces intrude into the cylindrical seat.

4. The bearing arrangement according to claim 1, wherein bottom portions of the press-fitted locking pieces are extending in tangential directions along the circumference of the cylindrical seat.

5. The bearing arrangement according to claim 1, wherein at least one of the press-fitted locking pieces is at least one of: a T-bar element and an I-bar element.

6. The bearing arrangement according to claim 5, wherein at least one of the T-bar element and the I-bar element is made from a metal.

7. The bearing arrangement according to claim 1, wherein at least one spring element is arranged between the at least one of the press-fitted locking pieces and one of the adjacent radial bearing bodies.

8. The bearing arrangement according to claim 7, wherein the at least one spring element is an elastomer.

9. The bearing arrangement according to claim 1, wherein the press-fitted locking pieces comprise a stop plate arranged against a rim of the cylindrical seat in an axial direction along the longitudinal axis.

10. The bearing arrangement according to claim 1, wherein each one of the multiple radial bearing pads is attached to one of the multiple radial bearing bodies by means of a radial tiltable support structure.

11. The bearing arrangement according to claim 1, wherein at least one curved interface plate is attached to at least one of the multiple radial bearing bodies opposite of the radial bearing pad, further wherein the at least one curved interface plate is arranged in contact with the cylindrical seat of the radial fluid bearing.

12. A wind turbine comprising:
   a bearing arrangement comprising a bearing housing; a drive shaft, wherein the drive shaft is arranged within the bearing housing in an axial direction along a longitudinal axis of the bearing housing; a downwind bearing; and an upwind bearing, the downwind bearing and the upwind bearing being arranged between the bearing housing and the drive shaft, wherein the downwind bearing and/or the upwind bearing is a radial fluid bearing comprising multiple radial bearing pads; wherein each one of the multiple radial bearing pads is attached to one of a multiple radial bearing bodies of the radial fluid bearing and the multiple radial bearing pads are arranged about the drive shaft; wherein the multiple bearing bodies are arranged adjacent to one another along a circumference of a cylindrical seat of the bearing housing, the adjacent bearing bodies being locked in movement relative to one another and relative to the cylindrical seat by means of press-fitted locking pieces that provide dovetail connections with the cylindrical seat; and
   a rotor operatively connected to drive the drive shaft and a generator operatively connected to be driven by the drive shaft.

* * * * *